United States Patent
Yoshimura (10) Patent No.: US 11,280,252 B2
(45) Date of Patent: Mar. 22, 2022

(54) CONTROL VALVE, FLOW RATE CONTROL VALVE, AND TWO-MEMBER CONNECTING STRUCTURE

(71) Applicant: HITACHI AUTOMOTIVE SYSTEMS, LTD., Hitachinaka (JP)

(72) Inventor: Takeshi Yoshimura, Atsugi (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/257,640

(22) PCT Filed: Jun. 12, 2019

(86) PCT No.: PCT/JP2019/023186
§ 371 (c)(1),
(2) Date: Jan. 4, 2021

(87) PCT Pub. No.: WO2020/008822
PCT Pub. Date: Jan. 9, 2020

(65) Prior Publication Data
US 2021/0317773 A1    Oct. 14, 2021

(30) Foreign Application Priority Data
Jul. 5, 2018  (JP) .............................. JP2018-128005

(51) Int. Cl.
*F01P 7/16* (2006.01)
*F16L 11/04* (2006.01)
(Continued)

(52) U.S. Cl.
CPC ................ *F01P 7/16* (2013.01); *B60K 11/02* (2013.01); *F01P 11/04* (2013.01); *F16K 27/00* (2013.01); *F01P 2007/146* (2013.01)

(58) Field of Classification Search
CPC ....... F16K 27/00; F16L 11/04; F01L 2301/00; F01P 2007/146
See application file for complete search history.

(56) References Cited

U.S. PATENT DOCUMENTS

| | | | |
|---|---|---|---|
| 7,175,101 B2 | 2/2007 | Moriyama et al. | |
| 2006/0076052 A1* | 4/2006 | Hawks | E03D 3/02 137/15.18 |

(Continued)

FOREIGN PATENT DOCUMENTS

| | | |
|---|---|---|
| EP | 2 034 155 | 3/2009 |
| JP | S57-102511 | 6/1982 |

(Continued)

OTHER PUBLICATIONS

Notice of Reasons for Refusal dated Oct. 12, 2021 issued in JP Application No. 2020-528756, with English translation, 14 pages.

(Continued)

*Primary Examiner* — Long T Tran
(74) *Attorney, Agent, or Firm* — Foley & Lardner LLP (57) ABSTRACT

A control valve for use in a heat exchange circuit of an engine of an automobile includes a housing and a connection pipe. The housing includes a communication port structured for introduction or discharge of fluid. The connection pipe is fastened to the communication port of the housing with a fastening member. The housing is made of resin. Each of the connection pipe and the fastening member is made of material, such as metal, less in linear expansion coefficient than the housing.

18 Claims, 9 Drawing Sheets

(51) Int. Cl.
*F16K 27/00* (2006.01)
*B60K 11/02* (2006.01)
*F01P 11/04* (2006.01)
*F01P 7/14* (2006.01)

(56) References Cited

U.S. PATENT DOCUMENTS

| | | | | |
|---|---|---|---|---|
| 2008/0017353 | A1* | 1/2008 | Folea | F01P 7/14 165/96 |
| 2012/0175545 | A1* | 7/2012 | Yamamoto | F02M 21/0233 251/366 |
| 2015/0107704 | A1* | 4/2015 | Shishido | F16K 1/04 137/556 |
| 2017/0248262 | A1* | 8/2017 | Taniguchi | F16L 37/146 |
| 2018/0149073 | A1* | 5/2018 | Shen | F16K 31/042 |
| 2019/0017612 | A1* | 1/2019 | Ikemoto | F01P 7/14 |
| 2020/0109787 | A1* | 4/2020 | Tsuji | F01P 11/04 |
| 2020/0114725 | A1* | 4/2020 | Kanzaki | F16K 11/165 |

FOREIGN PATENT DOCUMENTS

| | | |
|---|---|---|
| JP | S62-124221 U | 8/1987 |
| JP | H7-63966 | 3/1995 |
| JP | H8-28727 | 2/1996 |
| JP | H10-317961 | 12/1998 |
| JP | 2004-270646 A | 9/2004 |
| JP | 2009-062938 | 3/2009 |
| JP | 2018-100636 | 6/2018 |

OTHER PUBLICATIONS

International Search Report dated Aug. 20, 2019 issued in International Application No. PCT/JP2019/023186, with English translation, 5 pages.
Written Opinion of the International Searching Authority dated Aug. 20, 2019 issued in International Application No. PCT/JP2019/023186, with English translation, 20 pages.

* cited by examiner

CONTROL VALVE, FLOW RATE CONTROL VALVE, AND TWO-MEMBER CONNECTING STRUCTURE

TECHNICAL FIELD

The present invention relates to a control valve, a flow rate control valve, and a two-member connecting structure.

BACKGROUND ART

Patent Document 1 discloses a conventional control valve.

This control valve is provided with a resin-made housing including a communication port in a peripheral wall of the housing, wherein a resin-made connection pipe is fixed to the communication port with a metallic screw serving as a fixing member.

PRIOR ART DOCUMENT(S)

Patent Document(s)

Patent Document 1: JP H08-028727 A

SUMMARY OF THE INVENTION

Problem(s) to be Solved by the Invention

The conventional control valve is formed such that both of the housing and the connection pipe are made of synthetic resin and are fixed to each other using the screw made of metal. This causes the connection pipe to expand more than the screw due to heat of fluid flowing through the connection pipe, wherein the metal forming the screw is smaller in linear expansion coefficient than the synthetic resin forming the connection pipe. Because of such difference in thermal expansion, the thermal expansion of the connection pipe causes the screw to be pulled outward, and may result in plastic deformation of a screw hole of the housing and deterioration in axial force of the screw.

In view of the technical problem above, it is desirable to provide a control valve, a flow rate control valve, and a two-member connecting structure which suppress a fixing member from being deteriorated in axial force.

Means for Solving the Problem(s)

According to one aspect of the present invention, a control valve to be disposed in a heat exchange circuit of an engine of an automobile includes a housing made of resin, a connection pipe made of metal, and a fastening member made of metal, wherein the connection pipe is fastened to the housing with the fastening member.

In other words, the control valve according to the one aspect of the present invention is formed such that each of the connection pipe and the fastening member is made of material less in linear expansion coefficient than the housing.

According to another aspect of the present invention, in a two-member connecting structure for two members used under an environment in which thermal expansion due to temperature variation occurs, a connection member made of metal is connected to a connection base made of resin, with a fastening member made of metal.

Effect(s) of the Invention

The present invention serves to suppress a fixing member from being deteriorated in axial force.

BRIEF DESCRIPTION OF THE DRAWINGS

in FIG. 4.

MODES(S) FOR CARRYING OUT THE INVENTION

The following describes an embodiment of a control valve, a flow rate control valve, and a two-member connecting structure according to the present invention, with reference to the drawings. The following embodiment exemplifies a system in which the control valve etc. according to the present invention are installed in a conventional circulation path of cooling water for automobile (which is simply referred to as "cooling water" in the following).

[Configurations of Cooling Water Circulation Path]

Figure 1:
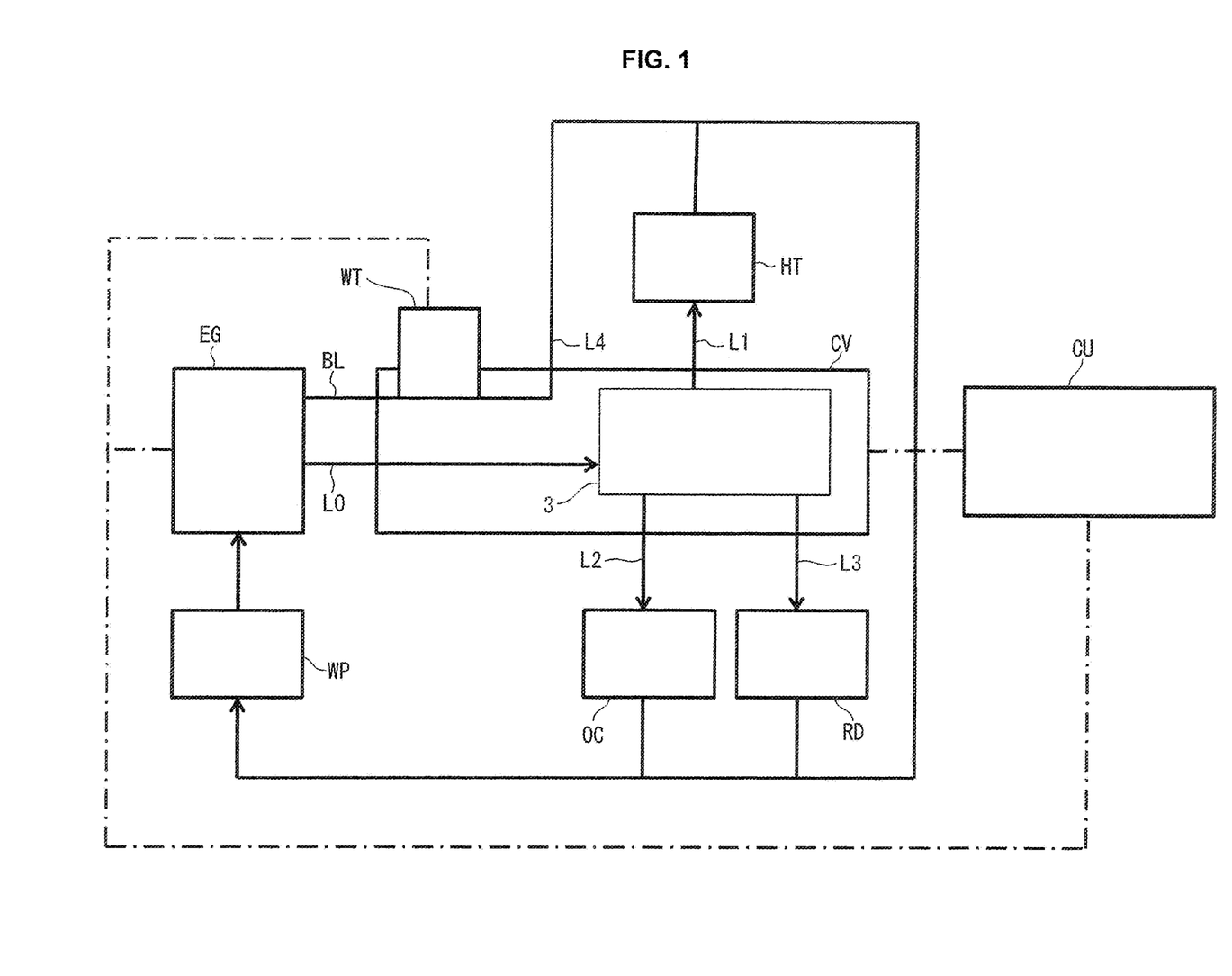
FIG. 1 is a block diagram showing a configuration of a circulation path of cooling water for automobile which includes a control valve etc. according to the present invention.

FIG. 1 is a block diagram showing a configuration of the cooling water circulation path serving as a cooling device of an engine provided with the control valve, the flow rate control valve, and the two-member connecting structure, which are referred to as "control valve etc." in the following, according to the present invention.

Control valve CV serving as the flow rate control valve is disposed at a side of engine EG of an automobile (specifically, at a side of a cylinder head not shown), and is surrounded by devices such as engine EG, a heater HT, an oil cooler OC, and a radiator RD, as shown in FIG. 1. Heater HT is a heat exchanger for room heating, and is structured to perform heat exchange for generation of warm wind from an air conditioner not shown. Oil cooler OC is structured to cool oil used for lubrication of an sliding portion of engine EG. Radiator RD is structured to cool the cooling water used for cooling of engine EG.

A reference sign WP in FIG. 1 represents a water pump used for circulation of the cooling water. A reference sign WT in FIG. 1 represents a water temperature sensor used for drive control of control valve CV. A reference sign CU in FIG. 1 represents an electronic control unit serving as a flow path controller structured to switch and control a flow path of the cooling water by controlling drive of control valve CV with reference to a measurement result of water temperature sensor WT.

Specifically, the cooling water discharged from water pump WP is sent to control valve CV via an intake passage L0. Then, control valve CV (i.e. a valve element 3) is driven depending on a control signal from flow path controller CU, based on operation conditions of engine EG such as the measurement result of water temperature sensor WT. This causes the cooling water sent to control valve CV via intake passage L0 to be distributed to heater HT, oil cooler OC, and radiator RD via a first pipe L1, a second pipe L2, and a third pipe L3 respectively.

Control valve CV is provided with a bypass passage BL for bypassing of intake passage L0 and constant circulation of the cooling water. This allows the cooling water sent to bypass passage BL to be immediately returned to engine EG via a fourth pipe L4, so as to perform the constant circulation of the cooling water.

As described above, control valve CV serves as a so-called 1in-3out type distribution device, and distributes the cooling water from intake passage L0 to first pipe L1, second pipe L2, and third pipe L3, while controlling a flow rate of the cooling water upon the distribution.

Although the present embodiment employs engine EG being an internal combustion engine as one aspect of an engine for automobile, the engine may be any other device structured to convert energy to motive power, such as a motor and a fuel cell.

Figure 2:
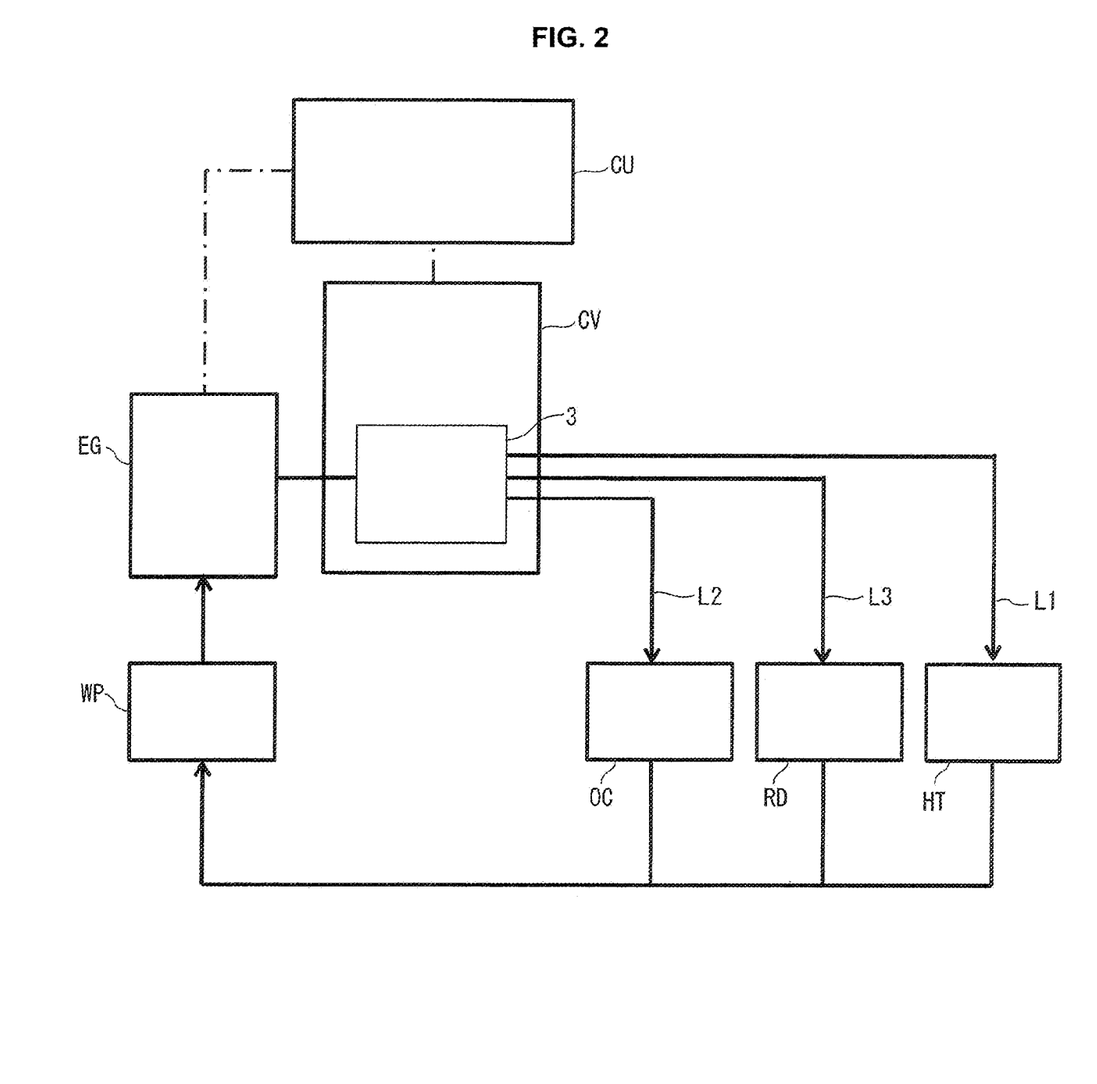
FIG. 2 is a block diagram showing another configuration of the circulation path of cooling water for automobile which includes the control valve etc. according to the present invention.

FIG. 2 is a block diagram showing another configuration of the cooling water circulation path which involves the control valve etc. according to the present invention.

As shown in FIG. 2, it is allowed to dispose control valve CV without bypass passage BL shown in FIG. 1 and without the constant circulation using fourth pipe L4, depending on specification of engine EG etc.

Figure 3:
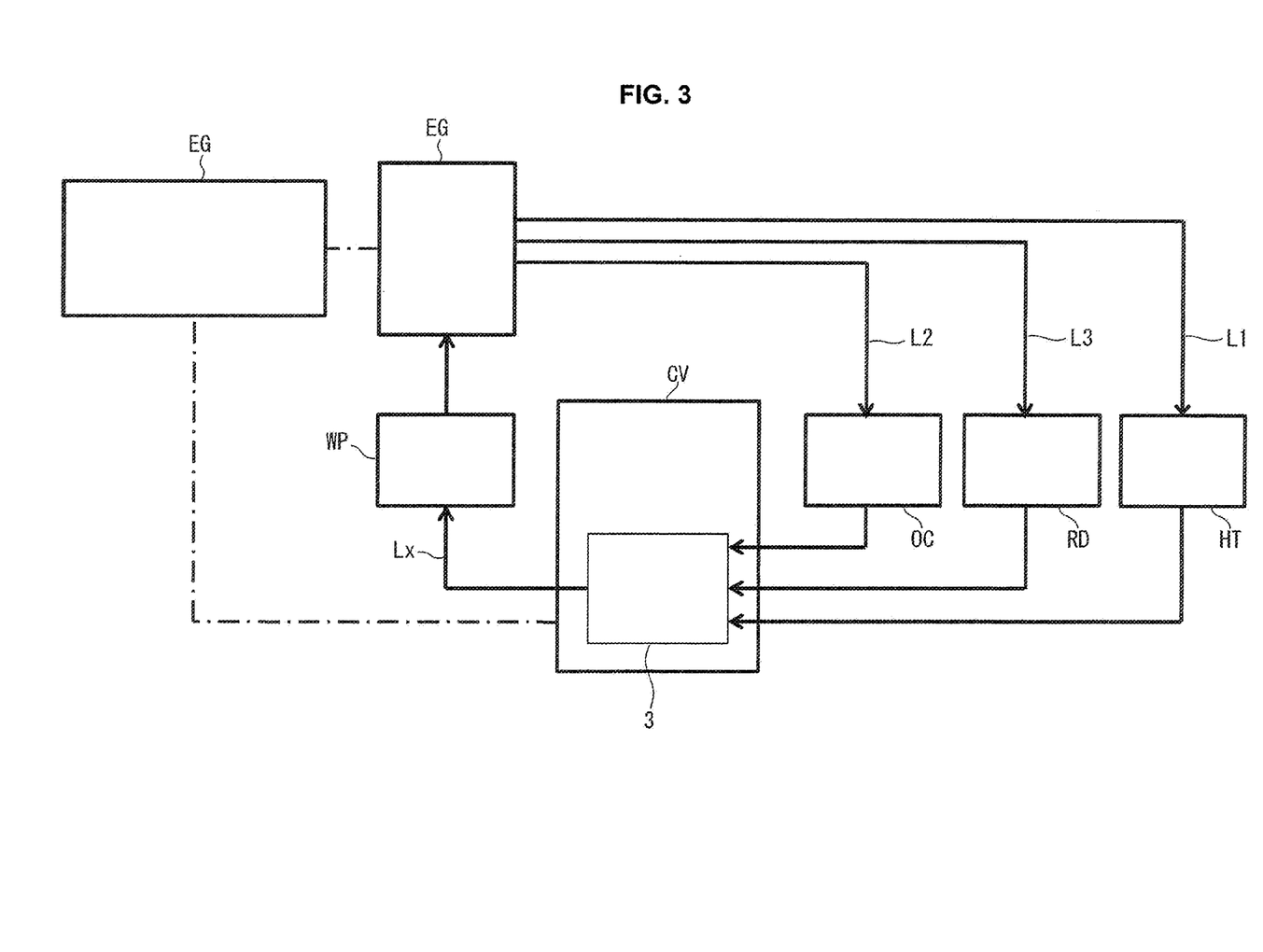
FIG. 3 is a block diagram showing still another configuration of the circulation path of cooling water for automobile which includes the control valve etc. according to the present invention.

FIG. 3 is a block diagram showing still another configuration of the cooling water circulation path which involves the control valve etc. according to the present invention.

As shown in FIG. 3, in a manner other than that in FIG. 1, it is allowed to dispose control valve CV directly before water pump WP, and use control valve CV as a so-called 3in-1out type merging device. In such case, control valve CV as the merging device merges cooling water flowing into it from first pipe L1, second pipe L2, and third pipe L3, and returns the cooling water toward engine EG via a discharge passage Lx, while controlling the flow rate of the cooling water upon the merging.

[Configurations of Control Valve]

Figure 4:
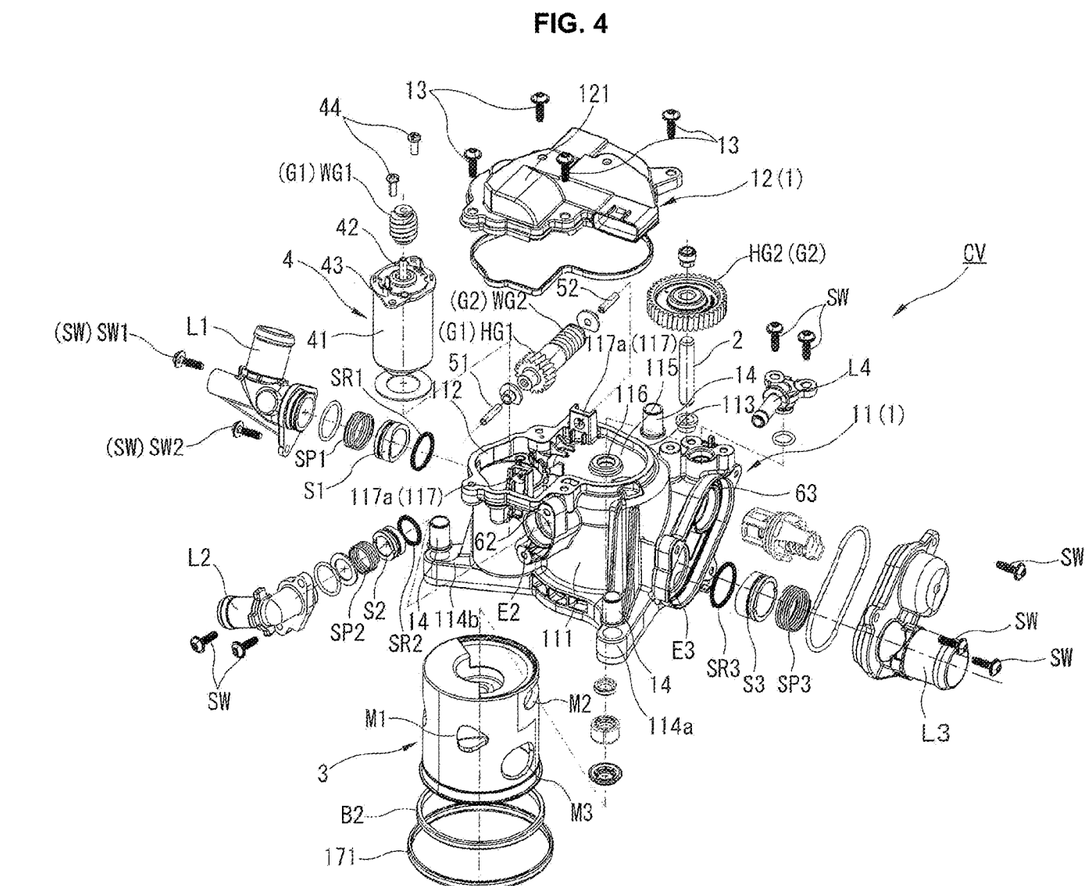
FIG. 4 is an exploded perspective view of the control valve etc. according to the present invention.
Figure 5:
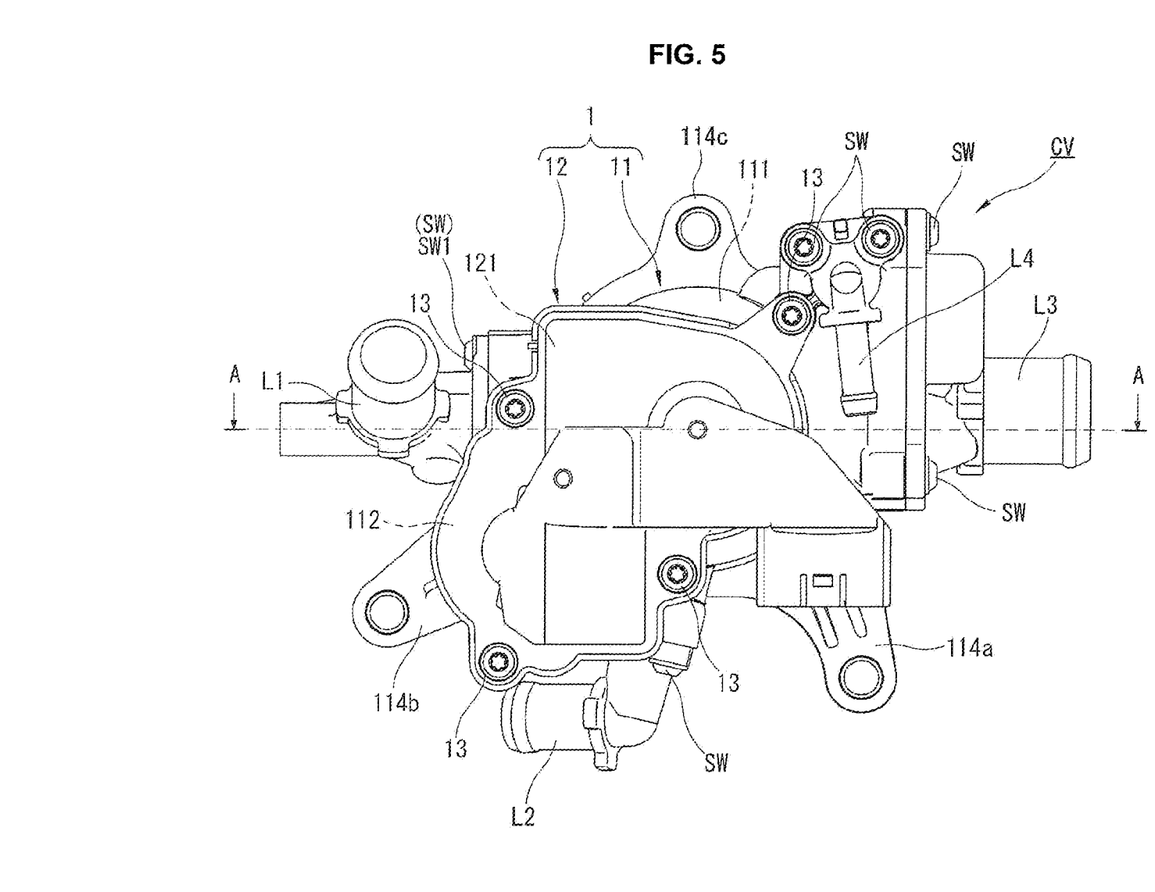
FIG. 5 is a plan view of the control valve etc.

FIG. 4 is an exploded perspective view of control valve CV according to the present embodiment. FIG. 5 is a plan view of control valve CV formed by assembling control valve CV in FIG. 4. In the following explanation of these drawings, "axial direction" is referred to as a direction parallel with a rotational axis Z of a drive shaft 2, and "radial direction" is referred to as a direction perpendicular to rotational axis Z of drive shaft 2, and "circumferential direction" is referred to as a direction around rotational axis Z of drive shaft 2. Furthermore, in connection with the axial direction, "first end side" is referred to as an upper side in FIG. 4, and "second end side" is referred to as a lower side in FIG. 4.

As shown in FIGS. 4 and 5, control valve CV includes a valve element 3, an electric motor 4, and a speed reducer 5. Valve element 3 has a tubular shape, and is supported inside a housing 1 rotatably due to drive shaft 2. Electric motor 4 is contained in housing 1, and is structured to rotate valve element 3. Speed reducer 5 is contained in housing 1, and is structured for speed reduction and transfer of the rotation of electric motor 4.

Housing 1 is composed of two components divided in the axial direction: a first housing 11 and a second housing 12. First housing 11 is structured to contain valve element 3 and electric motor 4. Second housing 12 is formed to close an opening of first housing 11 in the first end side, and is structured to contain speed reducer 5. First housing 11 and second housing 12 are made of synthetic resin, and are fixed to each other with bolts 13.

First housing 11 includes a valve container 111 and a motor container 112. Valve container 111 has a shape of hollow cylindrical tube so as to contain valve element 3. Motor container 112 is disposed alongside valve container 111, and has a shape of hollow cylindrical tube so as to contain a motor body 41 of electric motor 4. First housing 11 includes mounting portions (i.e. flanges 114a, 114b, and 114c described below) in the second side in the axial direction, and is fixed to a cylinder block not shown via the mounting portions, with a fixing mean not shown such as bolts.

Valve container 111 is closed by an end wall 113 at an end of the first end side in the axial direction, and is open at an end of the second end side in the axial direction. In the second end side, valve container 111 includes the plurality of (e.g. three in the present embodiment) flanges 114a, 114b, and 114c for the fixing to the cylinder block not shown. Each of flanges 114a, 114b, and 114c projects substantially radially, i.e. outwardly in the radial direction. Flanges 114a, 114b, and 114c are arranged at substantially equal intervals in the circumferential direction. Furthermore, each of flanges 114a, 114b, and 114c includes a through hole 114d having a circular cross section and extending in the axial direction. Into each of through holes 114d, a sleeve 14 is press-fitted, wherein sleeve 14 has a cylindrical tubular shape and is made of metal. Each of sleeves 14 is substantially same with flanges 114a, 114b, and 114c in height (i.e. length in the axial direction), and is structured to receive an axial force of the bolt not shown.

End wall 113 of valve container 111 includes a boss 115 having a shape of lidded cylindrical tube and projecting toward second housing 12. Boss 115 includes a shaft through hole 116 extending through boss 115, such that drive shaft 2 is disposed to extend through shaft through hole 116. End wall 113 of valve container 111 further includes a pair of bearings 117, 117 each of which has a shape of plate vertically rising from end wall 113. The pair of bearings 117, 117 serve as bearings for support shafts 51, 52 of speed reducer 5 described below. Each of bearings 117, 117 includes a bearing hole 117a being a through hole, so as to rotatably support a corresponding one of support shafts 51, 52.

First housing 11 includes a first mounting face 61, a second mounting face 62, and a third mounting face 63 in a side wall (i.e. a peripheral wall) of valve container 111. Each of first mounting face 61, second mounting face 62, and third mounting face 63 is formed to be substantially flat as a fixing base, where first pipe L1, second pipe L2, and third pipe L3 serving as connector pipes (or connector members) are respectively mounted to first mounting face 61, second mounting face 62, and third mounting face 63 so as to connect valve container 111 to heater HT, oil cooler OC, and radiator RD (see FIG. 1). In addition, reference sign L4 in FIG. 4 or 5 represents fourth pipe L4 structured to directly return the cooling water in bypass passage BL (see FIG. 1)

toward engine EG (see FIG. 1). Each of first pipe L1, second pipe L2, third pipe L3, and fourth pipe L4 is fixed or fastened to first housing 11 with screws SW made of a material, e.g. a metal, less in linear expansion coefficient than a synthetic resin forming the housing 1.

Second housing 12 is shaped to have a concave cross section and be open so as to straddle and cover the valve container 111 and motor container 112. Such concave interior space forms a speed reducer container 121 to contain speed reducer 5.

Electric motor 4 includes motor body 41 to be contained in motor container 112 such that an output shaft 42 of electric motor 4 is directed toward second housing 12. Electric motor 4 is fixed to an opening rim of motor container 112 with bolts 44, via a flange 43 of electric motor 4 which is formed at an end of motor body 41 adjacently to output shaft 42 and extends outwardly in the radial direction. Electric motor 4 is driven under control of in-vehicle electronic control unit CU (see FIG. 1), and rotates valve element 3 depending on operation conditions of a vehicle. This allows the cooling water to be appropriately distributed to radiator RD etc. (see FIG. 1).

Speed reducer 5 is a drive mechanism including first gears G1 and second gears G2 which are two pairs of skew gears. First gears G1 are composed of a first worm gear WG1 and a first helical gear HG1. First worm gear WG1 is disposed along a same axis with output shaft 42 of electric motor 4, and rotates integrally with output shaft 42. First helical gear HG1 is rotatably supported by support shaft 51 disposed perpendicularly to output shaft 42 of electric motor 4, and engages with first worm gear WG1. Second gears G2 are composed of a second worm gear WG2 and a second helical gear HG2. Second worm gear WG2 is rotatably supported by support shaft 52 disposed perpendicularly to output shaft 42 of electric motor 4, and rotates integrally with first helical gear HG1. Second helical gear HG2 is fixed to drive shaft 2, and engages with second worm gear WG2. First helical gear HG1 and second worm gear WG2 each of which has a tubular shape are arranged in alignment, and compose a composite gear member formed integrally. This composite gear member is rotatably supported by the pair of bearings 117, 117 of first housing 11, via support shafts 51 and 52 inserted in both ends of the composite gear member. Such configurations allow a rotational drive force from output shaft 42 of electric motor 4 to be transferred to valve element 3 while undergoing two-step speed reduction through first gears G1 and second gears G2.

Figure 6:
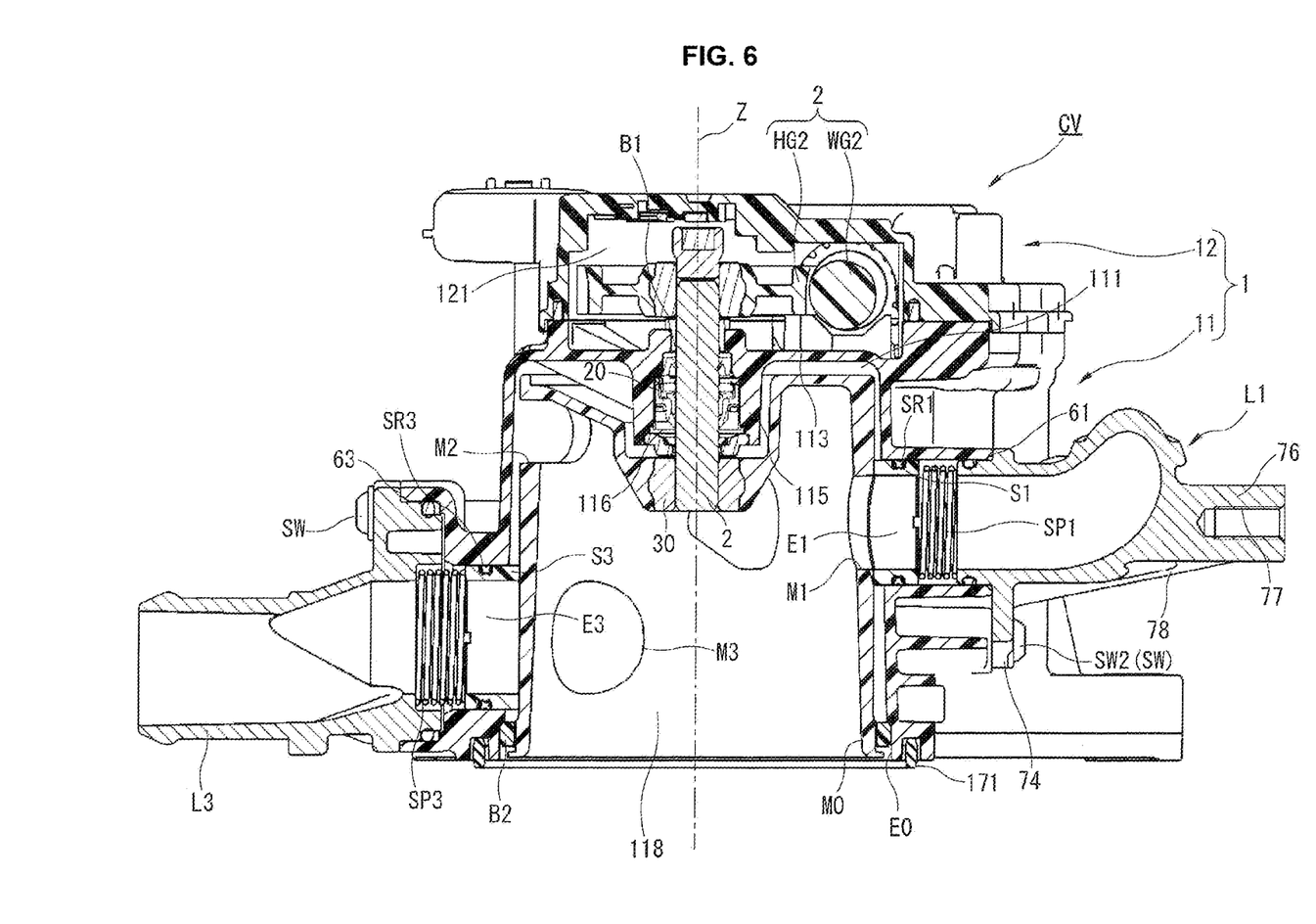
FIG. 6 is a cross sectional view along a line A-A in FIG. 5.

FIG. 6 is a cross sectional view of control valve CV along a line A-A shown in FIG. 5. In the following explanation of this drawing, "axial direction" is referred to as the direction parallel with rotational axis Z of drive shaft 2, and "radial direction" is referred to as the direction perpendicular to rotational axis Z of drive shaft 2, and "circumferential direction" is referred to as the direction around rotational axis Z of drive shaft 2. Furthermore, in connection with the axial direction, "first end side" is referred to as an upper side in FIG. 6, and "second end side" is referred to as a lower side in FIG. 6.

As shown in FIG. 6, valve container 111 of first housing 11 has the shape of bottomed cylindrical tube, and includes in the axial direction a first end in the first end side and a second end in the second end side, wherein the first end of valve container 111 is closed by end wall 113, and the second end of valve container 111 is open to the outside. Boss 115 formed in end wall 113 of valve container 111 includes shaft through hole 116 through which drive shaft 2 extends. Shaft through hole 116 extends in the axial direction, from valve container 111 to speed reducer container 121 described below. Furthermore, motor container 112 of first housing 11 (see FIG. 4) is disposed adjacently to valve container 111. Motor container 112 has the shape of bottomed cylindrical tube to contain motor body 41 of electric motor 4, and is open to the first end side in the axial diction.

First housing 11 includes an intake port EU in the second end of valve container 111 in the axial direction. Intake port E0 corresponds to a communication port (i.e. a main communication port) according to the present invention, and is open for communication with an inside of the cylinder block not shown and introduction of the cooling water from a cylinder block side. In detail, in a state that control valve CV is mounted to the engine (i.e. to the cylinder block) not shown, intake port E0 communicates with an opening of the cylinder block side, and the cooling water is introduced from the cylinder block side to valve container 111 via intake port E0.

Valve container 111 includes in its peripheral wall a first discharge port E1, a second discharge port E2, and a third discharge port E3. Each of first discharge port E1, second discharge port E2, and third discharge port E3 is a through hole having a substantially circular cross section and establishing communication between valve container 111 and the outside, and is connected to a corresponding one of first pipe L1, second pipe L2, and third pipe L3: in the following, see FIG. 4 in regard to second discharge port E2. For example, first discharge port E1 communicates with heater HT via first pipe L1. Second discharge port E2 communicates with oil cooler OC via second pipe L2. Third discharge port E3 communicates with radiator RD via third pipe L3.

First discharge port E1, second discharge port E2, and third discharge port E3 are different from each other in position in the axial direction in the peripheral wall of first housing 11, and are different from each other in position in the circumferential direction in the peripheral wall of first housing 11: specifically, these discharge ports E1, E2, and E3 are arranged at intervals of approximately 90° in phase (see FIG. 5). According to the present embodiment, at least first pipe L1 out of first pipe L1, second pipe L2, and third pipe L3 is made of a material less than a synthetic resin in linear expansion coefficient, such as a metal (e.g. an aluminum alloy in the present embodiment).

Each of first discharge port E1, second discharge port E2, and third discharge port E3 is provided with a seal mean disposed in an inner peripheral side with respect to the each of first discharge port E1, second discharge port E2, and third discharge port E3 and structured to establish airtight sealing between valve element 3 and the each of first discharge port E1, second discharge port E2, and third discharge port E3. Each of the seal means is composed of a corresponding one of a first seal member S1, a second seal member S2, and a third seal member S3 and a corresponding one of a first coil spring SP1, a second coil spring SP2, and a third coil spring SP3. Each of first seal member S1, second seal member S2, and third seal member S3 has a cylindrical tubular shape, and is made of synthetic resin. Each of first coil spring SP1, second coil spring SP2, and third coil spring SP3 is made of metal, and is structured to bias a corresponding one of first seal member S1, second seal member S2, and third seal member S3 toward valve element 3. Furthermore, each of first seal member S1, second seal member S2, and third seal member S3 is provided with a corresponding one of a first seal ring SR1, a second seal ring SR2, and a third seal ring SR3 mounted to an outer periphery of the each of first seal member S1, second seal member S2, and third seal member S3 and structured to be in sliding contact with a corresponding one of first discharge port E1, second discharge port E2, and third discharge port E3.

Each of first seal member S1, second seal member S2, and third seal member S3 is made of a predetermined fluororesin, e.g. a polytetrafluoroethylene (PTFE) in the present embodiment, and is contained in the inner peripheral side of a corresponding one of first discharge port E1, second discharge port E2, and third discharge port E3, and is movably structured to proceed toward or recede from valve element 3. First coil spring SP1 is disposed between first seal member S1 and first pipe L1 with a predetermined setting load, and biases first seal member S1 toward valve element 3. Similarly, second coil spring SP2 is disposed between second seal member S2 and second pipe L2 with a predetermined setting load, and biases second seal member S2 toward valve element 3. Third coil spring SP3 is disposed between third seal member S3 and third pipe L3 with a predetermined setting load, and biases third seal member S3 toward valve element 3.

Drive shaft 2 has a rod shape constant in outer diameter, and extends through the shaft through hole 116 to straddle valve container 111 and speed reducer container 121, and is rotatably supported by a bearing B1 contained and supported in an inner periphery of boss 115. Drive shaft 2 is provided with a seal member 20 structured to establish airtight sealing between drive shaft 2 and shaft through hole 116. Seal member 20 serves to suppress the cooling water in valve container 111 from leaking out toward second housing 12 via shaft through hole 116.

Valve element 3 has the shape of bottomed cylindrical tube constant in outer diameter, and is made of a predetermined rigid resin, and includes an intake section M0 that is an opening formed in the second end side of valve element 3 in the axial direction. Intake section M0 is disposed to face intake port E0. This allows the cooling water to be introduced to an interior passage 118 formed in an inner peripheral side with respect to valve element 3. Valve element 3 includes in the axial direction a first end in the first end side and a second end in the second end side. The first end of valve element 3 is fixed to drive shaft 2 by press-fitting, via an insertion member 30 made of metal and disposed in an inner periphery of the first end of valve element 3. The second end of valve element 3 faces intake port E0, and is rotatably supported by a bearing B2 held in an inner peripheral side with respect to intake port E0.

Valve element 3 includes in its peripheral wall a first opening M1, a second opening M2, and a third opening M3 which respectively extend through the peripheral wall in the radial direction. Each of first opening M1, second opening M2, and third opening M3 is same in axial position with a corresponding one of first discharge port E1, second discharge port E2, and third discharge port E3 of first housing 11, so as to communicate with the corresponding one at a predetermined rotational position (i.e. a predetermined phase). The number and shapes of first opening M1, second opening M2, and third opening M3 are determined depending on a control method of valve element 3: for example, each of the openings may be shaped as a circle or an ellipse longer in the circumferential direction.

Thus-configured control valve CV distributes the cooling water to first pipe L1, when valve element 3 is positioned in the circumferential direction such that first opening M1 and first discharge port E1 overlap with each other at least partially. Similarly, control valve CV distributes the cooling water to second pipe L2, when valve element 3 is positioned in the circumferential direction such that second opening M2 and second discharge port E2 overlap with each other at least partially. Control valve CV distributes the cooling water to third pipe L3, when valve element 3 is positioned in the circumferential direction such that third opening M3 and third discharge port E3 overlap with each other at least partially. Upon the distribution of the cooling water, the cooling water varies in flow rate depending on variation in overlap condition (i.e. overlap area) between first opening M1, second opening M2, and third opening M3 and first discharge port E1, second discharge port E2, and third discharge port E3.

Figure 7:
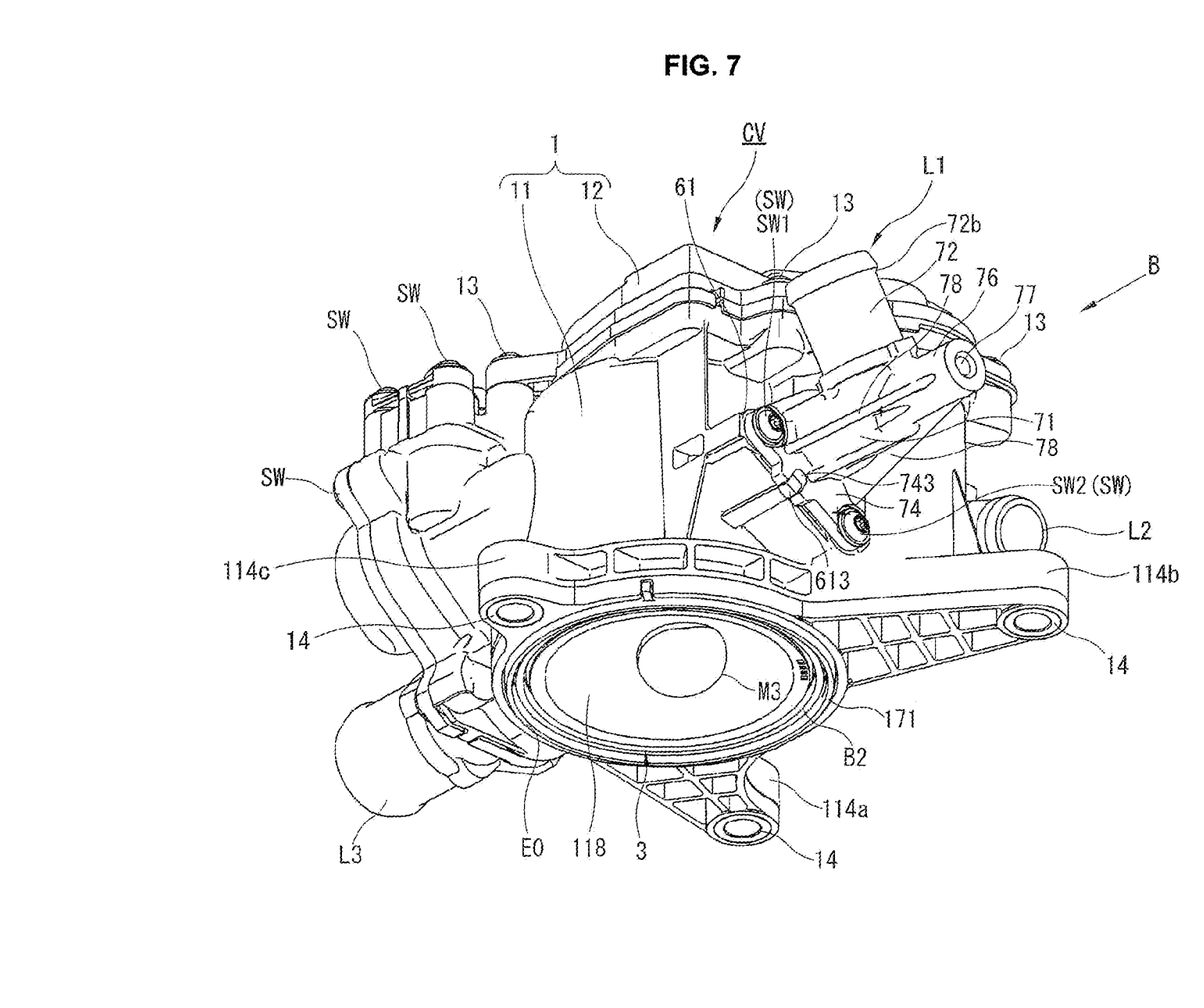
FIG. 7 is a perspective view of the control valve in FIG. 4, viewed from a bottom side thereof.
Figure 8:
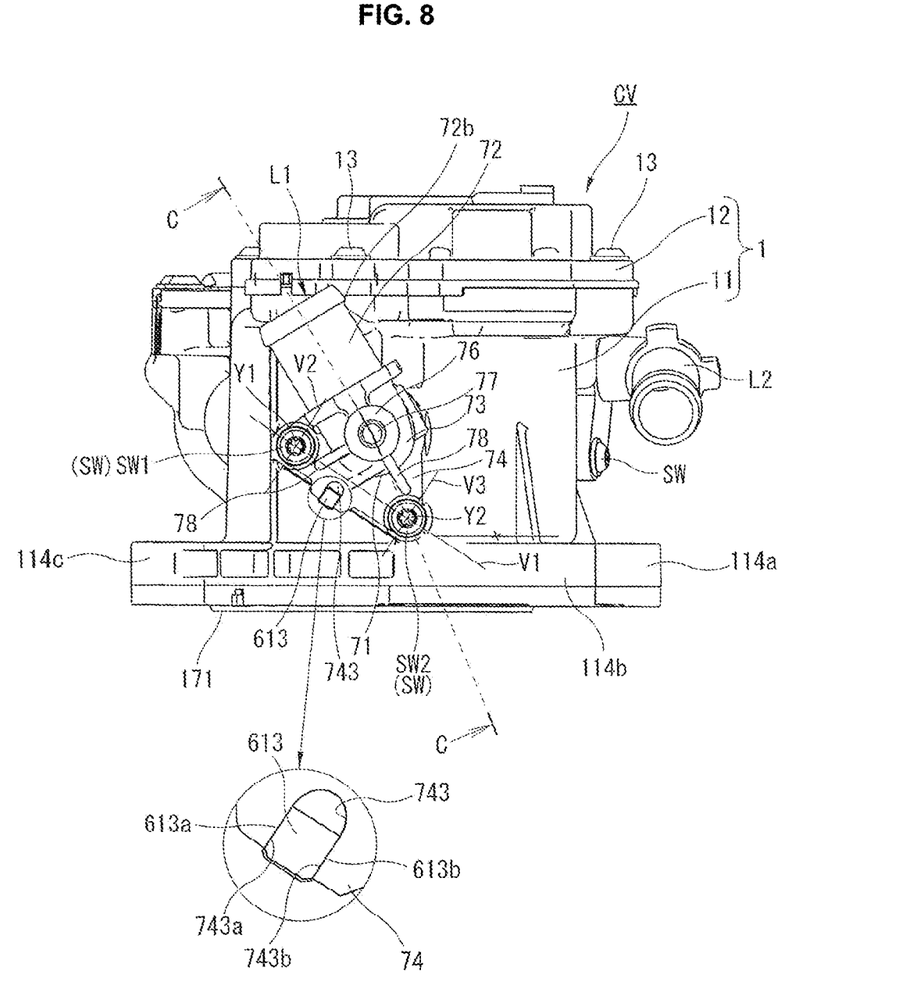
FIG. 8 is a view on an arrow B in FIG. 7.
Figure 9:
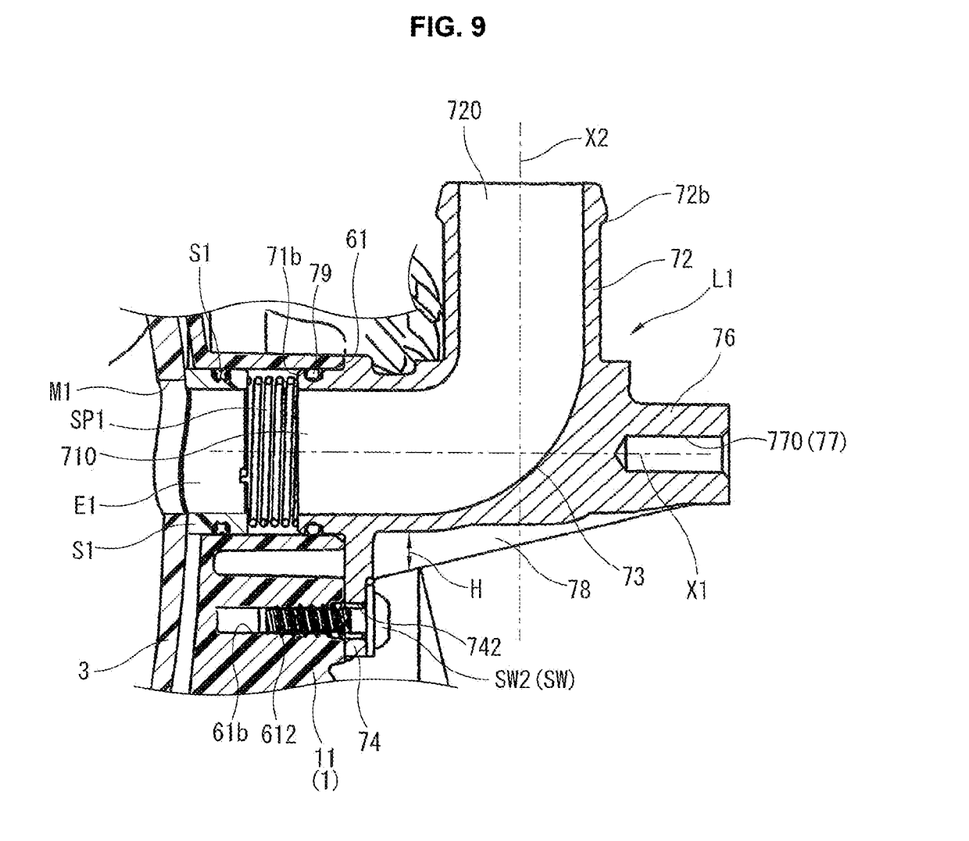
FIG. 9 is a cross sectional view along a line C-C in FIG. 8.

FIG. 7 is a perspective view of control valve CV in FIG. 4 when viewed from a side of the mounting portions. FIG. 8 is a view on an arrow B in FIG. 7. FIG. 9 is a cross sectional view of control valve CV along a line C-C in FIG. 8. In the following explanation of these drawings, "axial direction" is referred to as the direction parallel with rotational axis Z of valve element 3, and "radial direction" is referred to as the direction perpendicular to rotational axis Z of valve element 3, and "circumferential direction" is referred to as the direction around rotational axis Z of valve element 3.

As shown in FIGS. 7, 8, and 9, first pipe L1 made of metal is a hollow connection pipe having a substantially L-shaped longitudinal section, and includes a bent section 73 formed in a middle section of first pipe L1 and bent at a predetermined angle such as 90°: in other words, first pipe L1 has a so-called elbow shape. First pipe L1 includes a first end open to a side of first discharge port E1 and a second end open to a side of second housing 12 (i.e. an opposite side to intake port E0). In detail, first pipe L1 includes in its first end a housing connection section 71 to be connected to housing 1 (i.e. first housing 11). Housing connection section 71 extends straight from bent section 73 toward first discharge port E1. This first end directed to first discharge port E1 includes in its top a seat face 71b formed flat to be a seat for first coil spring SP1. On the other hand, first pipe L1 includes in its second end a pipe connection section 72 to be connected to a rubber pipe not shown. Pipe connection section 72 extends straight from bent section 73 toward second housing 12 (i.e. in a direction away from intake port E0 along the axis). This second end directed axially oppositely to intake port E0 includes in its top a stepped diameter section 72b. Stepped diameter section 72b is shaped to stepwisely increase in diameter toward the top, and serves to suppress the rubber pipe from falling out.

First pipe L1 is substantially constant in inner diameter, and bent section 73 includes an arc-shaped inner periphery. First pipe L1 is formed by casting of aluminum alloy with a so-called collapsible core such as a sand core. In other words, first pipe L1 according to the present embodiment is formed not with a segmental core but with a non-segmental core. This allows first pipe L1 to have an inner periphery flat throughout, without a burr due to splitting of the core.

Housing connection section 71 extends toward a rim of a first end opening 710 open to housing connection section 71, and includes a pipe fixing portion 74 for fixing of first pipe L1 and a housing insertion portion 75 projecting toward housing 1 (i.e. first housing 11) with respect to pipe fixing portion 74, wherein housing insertion portion 75 is inserted in first discharge port E1. Pipe fixing portion 74 has a shape of flange, and is positioned as shifted downward with respect to first end opening 710, and extends in a direction in which pipe connection section 72 extends.

Pipe fixing portion 74 includes in a longitudinal first end thereof a first through hole 741 through which a first screw SW1 extends, and includes in a longitudinal second end thereof a second through hole 742 through which a second screw SW2 extends. First screw SW1 inserted in first through hole 741 and second screw SW2 inserted in second through hole 742 are respectively screwed to a first internal screw 611 and a second internal screw 612 each of which is formed closely to first discharge port E1 in first mounting face 61 of housing 1 (i.e. first housing 11). Thereby, first pipe L1 is fixed or fastened to housing 1 (i.e. first housing 11). In addition, each of first through hole 741 and second through hole 742 has a substantially circular cross section, and is positioned as shifted downward with respect to first end opening 710 (or with respect to first discharge port E1), in pipe fixing portion 74.

Each of first screw SW1 and second screw SW2 is a so-called self-tapping screw or self-forming screw. First screw SW1 is screwed into a first pilot hole 61a having an inner diameter slightly smaller than an outer diameter of first screw SW1, and forms a first internal screw 611 in first pilot hole 61a while engaging with first internal screw 611, in order to fix first pipe L1. Similarly, second screw SW2 is screwed into a second pilot hole 61b having an inner diameter slightly smaller than an outer diameter of second screw SW2, and forms a second internal screw 612 in second pilot hole 61b while engaging with second internal screw 612, in order to fix first pipe L1. For convenience of the drawings, first pilot hole 61a and first internal screw 611 are omitted in the drawings although second pilot hole 61b and second internal screw 612 are shown (see FIGS. 8 and 9).

Pipe fixing portion 74 includes in its outer peripheral portion a depression 743 structured to engage with a projection 613 of housing 1 (i.e. first housing 11) which is formed in housing 1 and in a vicinity of first discharge port E1. In detail, depression 743 includes width-across-flats portions 743a, 743b that are opposite to and substantially parallel with each other. Projection 613 has a substantially rectangular cross section, and includes parallel two faces 613a, 613b structured to engage with width-across-flats portions 743a, 743b of depression 743. This facilitates position determination of pipe fixing portion 74 upon the fixing of pipe fixing portion 74 to housing 1 (i.e. first housing 11), and simultaneously suppresses pipe fixing portion 74 from co-rotating with first screw SW1 or second screw SW2 during the screwing of first screw SW1 and second screw SW2.

As shown in FIG. 8, when viewed in a direction of a rotational axis Y1 of first screw SW1 (or a rotational axis Y2 of second screw SW2), projection 613 is disposed between a second virtual line V2 and a third virtual line V3, where: second virtual line V2 crosses rotational axis Y1 of first screw SW1, and is orthogonal to a first virtual line V1 connecting rotational axis Y1 of first screw SW1 and rotational axis Y2 of second screw SW2; and third virtual line V3 crosses rotational axis Y2 of second screw SW2, and is orthogonal to first virtual line V1. Housing insertion portion 75 is provided with a seal ring 79 mounted to an outer periphery of housing insertion portion 75 and structured to be in elastic contact with an inner periphery of first discharge port E1. Seal ring 79 serves to establish airtight sealing between the inner periphery of first discharge port E1 and an outer periphery of first pipe L1 (i.e. the outer periphery of housing insertion portion 75). This suppresses the cooling water from leaking out via first discharge port E1, while suppressing a contamination etc. from intruding into first discharge port E1 from the outside.

First pipe L1 includes at bent section 73 an overhang 76 having a substantially cylindrical shape and projecting outwardly in the radial direction, i.e. projecting oppositely to housing connection section 71. In other words, overhang 76 extends in the direction of rotational axes of first screw SW1 and second screw SW2, and overlaps with first end opening 710 when viewed in the direction of rotational axes of first screw SW1 and second screw SW2. Overhang 76 has a central axis X1 orthogonal to a central axis X2 of a second end opening 720 of first pipe L1.

Overhang 76 includes in its top face an internal screw hole 77 formed to have an opening. Inside internal screw hole 77, an internal screw 770 is formed. Internal screw 770 is structured to receive a screw etc. not shown, which serves to enhance the fixing of rubber pipe by fastening with the screw a bracket etc. for the fixing of the rubber pipe. Although internal screw 770 is formed as a bottomed hole according to the present embodiment, internal screw hole 77 may be a through hole with which, for example, overhang 76 may be used for fixing a sensor probe not shown structured to measure a temperature of the cooling water flowing in first pipe L1.

First pipe L1 includes in its outer periphery a plurality of (e.g. two in the present embodiment) ribs 78 extending along housing connection section 71, from pipe fixing portion 74 to overhang 76. Each of ribs 78 is tapered to gradually decrease in height H from housing connection section 71 as followed from pipe fixing portion 74 to overhang 76. This improves pipe fixing portion 74 and its vicinity in strength, while mitigating increase in weight of first pipe L1 due to provision of ribs 78.

[Effects of Present Embodiment] The conventional control valve is formed such that both of the housing and the connection pipe are made of synthetic resin and are fixed to each other using the screw made of metal. This causes the connection pipe to expand more than the screw due to heat of fluid flowing through the connection pipe, wherein the metal forming the screw is smaller in linear expansion coefficient than the synthetic resin forming the connection pipe. Because of such difference in thermal expansion, the thermal expansion of the connection pipe causes the screw to be pulled outward, and may result in plastic deformation of the screw hole of the housing and deterioration in axial force of the screw.

In view of the foregoing, the control valve etc. according to the present embodiment are efficacy as follows, and serve to solve the problem of the conventional control valve.

Control valve CV is the control valve to be disposed in a heat exchange circuit of an engine (e.g. engine EG in the present embodiment) of an automobile, and includes: housing 1 (i.e. first housing 11) including first discharge port E1 being a first communication port for introduction or discharge of cooling water being fluid; and first pipe L1 being the connection pipe made of metal and fastened to first discharge port E1 with first screw SW1 and second screw SW2 being fastening members made of metal.

In detail, control valve CV is the flow rate control valve to be disposed in a cooling circuit of an engine (e.g. engine EG in the present embodiment) of an automobile, and includes housing 1, valve element 3, first screw SW1, second screw SW2, and the connection pipe, wherein: housing 1 (i.e. first housing 11) includes valve container 111 formed inside housing 1, intake port E0 being the main communication port for introduction of cooling water as coolant into valve container 111 or for discharge of the cooling water from valve container 111, first discharge port E1 being the first communication port for discharge of the cooling water from valve container 111 or for introduction of the cooling water into valve container 111 in cooperation with intake port E0, first mounting face 61 being the fixing base formed around first discharge port E1, and at least one internal screw (e.g. first internal screw 611 and second internal screw 612 in the present embodiment) disposed in first mounting face 61; valve element 3 is contained in valve container 111, and is structured to be rotated and thereby control the flow rate of the cooling water flowing between intake port E0 and first discharge port E1; first screw SW1 and second screw SW2 are made of a material (e.g. a metal in the present embodiment) less in linear expansion coefficient than housing 1, and are respectively screwed into first internal screw 611 and second internal screw 612; and the connection pipe is connected to first discharge port E1, and includes the pipe fixing portion fixed to the fixing base with first screw SW1 and second screw SW2, and is made of a material less in linear expansion coefficient than housing 1.

As described above, in control valve CV according to the present embodiment, at least first pipe L1 out of first pipe L1, second pipe L2, and third pipe L3 is made of a metal less in linear expansion coefficient than housing 1. This decreases a difference in thermal expansion between first pipe L1 and the screws SW1 and SW2 made of metal, and thereby reduces a force pulling first screw SW1 and second screw SW2 outwardly upon the thermal expansion of first pipe L1. This serves to suppress first internal screw 611 and second internal screw 612 from undergoing plastic deformation, and thereby suppress first screw SW1 and second screw SW2 from being deteriorated in axial force.

According to the present embodiment, each of first screw SW1 and second screw SW2 being the fastening members is a so-called self-tapping screw or self-forming screw.

According to the present embodiment, this configuration of forming first screw SW1 and second screw SW2 as self-tapping screws or self-forming screws serves to reduce clearances between first screw SW1 and first internal screw 611 and between second screw SW2 and second internal screw 612, and thereby reduce loosening of first screw SW1 and second screw SW2. Furthermore, the configuration of forming first screw SW1 and second screw SW2 as self-tapping screws or self-forming screws eliminates necessity for beforehand forming of first internal screw 611 and second internal screw 612, where forming of first pilot hole 61a and second pilot hole 61b is sufficient for preparation. This serves to reduce control valve CV in manufacturing cost.

According to the present embodiment, housing 1 (i.e. first housing 11) includes projection 613 formed closely to first discharge port E1 being the first communication port, and first pipe L1 being the connection pipe includes depression 743 structured to engage with and lock projection 613.

According to the present embodiment, upon a fixing operation of first pipe L1, the above configuration of forming first pipe L1 to include depression 743 structured to engage with projection 613 formed closely to first discharge port E1 serves to stop rotation of first pipe L1 while determining a position of first pipe L1. This facilitates the fixing operation of first pipe L1, and thereby improves control valve CV in productivity.

According to the present embodiment, first pipe L1 being the connection pipe includes bent section 73 bent at a predetermined angle.

According to the present embodiment, this configuration of forming first pipe L1 to include bent section 73 improves first pipe L1 in efficiency for arrangement, in comparison with a case of forming first pipe L1 to be straight. This improves control valve CV in efficiency for layout, and improves an automobile with control valve CV in efficiency for utilization of a space in an engine room thereof.

According to the present embodiment, bent section 73 is bent at 90°.

According to the present embodiment, this configuration of bending the bent section 73 at 90° allows control valve CV to be more compact. This facilitates mounting of control valve CV to an automobile being a mounting target.

According to the present embodiment, first pipe L1 being the connection pipe includes pipe connection section 72 that extends straight from bent section 73 and is connected to a rubber pipe not shown.

According to the present embodiment, this configuration of forming first pipe L1 to include pipe connection section 72 extending straight from bent section 73 to be connected to the rubber pipe allows the rubber pipe to be mounted and fixed to a straight part of pipe connection section 72. This facilitates appropriate mounting of the rubber pipe to first pipe L1.

According to the present embodiment, first pipe L1 being the connection pipe is formed using a collapsible core (e.g. a sand core in the present embodiment).

According to the present embodiment, this configuration of forming first pipe L1 with the collapsible core (specifically, the sand core) allows first pipe L1 to be formed into a desired shape. Furthermore, the configuration of using not a segmental core but the collapsible core allows first pipe L1 to have a smooth and seamless inner periphery, and thereby serves to reduce first pipe L1 in water passing resistance.

According to the present embodiment, first pipe L1 being the connection pipe includes overhang 76 projecting from bent section 73 and including internal screw hole 77 in which internal screw 770 is formed.

According to the present embodiment, this configuration of forming first pipe L1 to include overhang 76 inside which internal screw hole 77 is formed allows the rubber pipe not shown to be more firmly fixed using internal screw hole 77 of overhang 76. In another manner, internal screw hole 77 may be a through hole to which a sensor probe not shown may be mounted and fixed.

According to the present embodiment, first pipe L1 being the connection pipe includes pipe fixing portion 74 structured to receive first screw SW1 and second screw SW2 being the fastening members, and includes ribs 78 extending from pipe fixing portion 74 to overhang 76.

According to the present embodiment, this configuration of forming ribs 78 extending from pipe fixing portion 74 to overhang 76 serves to reinforce first pipe L1, and thereby improve first pipe L1 in strength. Ribs 78 serves also as heat sinks, and facilitates effective heat radiation of first pipe L1.

According to the present embodiment, bent section 73 includes the arc-shaped inner periphery on which the cooling water being fluid flows.

According to the present embodiment, this configuration of forming bent section 73 to include the arc-shaped inner periphery serves to reduce a water passing resistance of the cooling water flowing therein, and smooth the flow of the cooling water.

According to the present embodiment, first pipe L1 being the connection pipe is made of an aluminum out of metallic materials.

According to the present embodiment, this configuration of forming first pipe L1 from an aluminum (specifically, an aluminum alloy in the present embodiment) serves to reduce first pipe L1 in weight, in comparison with a case of forming first pipe L1 from other metallic material such as iron-based material. This serves to reduce first internal screw 611 and second internal screw 612 in load due to the axial force of first screw SW1 and second screw SW2.

According to the present embodiment, first internal screw 611 and second internal screw 612 are provided as internal screws, and first screw SW1 is provided to be screwed into first internal screw 611, and second screw SW2 is provided to be screwed into second internal screw 612.

According to the present embodiment, this configuration of fastening first pipe L1 at two points serves to enhance first pipe L1 in fastening strength, and thereby sufficiently firmly fix the first pipe L1 made of metal.

According to the present embodiment, projection 613 is formed in a vicinity of first discharge port E1. When viewed in the direction of rotational axis Y1 of first screw SW1, projection 613 is positioned between second virtual line V2 and third virtual line V3, where: second virtual line V2 crosses rotational axis Y1 of first screw SW1, and is orthogonal to first virtual line V1 connecting rotational axis Y1 of first screw SW1 and rotational axis Y2 of second screw SW2; and third virtual line V3 crosses rotational axis Y2 of second screw SW2, and is orthogonal to first virtual line V1.

According to the present embodiment, this configuration of positioning projection 613 between second virtual line V2 and third virtual line V3 serves to reduce pipe fixing portion 74 in size, in comparison with a case of positioning projection 613 outside with respect to second virtual line V2 or third virtual line V3. This serves to reduce first pipe L1 in weight, and thereby reduce first internal screw 611 and second internal screw 612 of housing 1 (i.e. first housing 11) in load due to the axial force of first screw SW1 and second screw SW2.

According to the present embodiment, first discharge port E1 being the first communication port is formed as shifted with respect to first virtual line V1, and is positioned between virtual line V2 and third virtual line V3.

Thus, according to the present embodiment, first discharge port E1 is not in alignment with first screw SW1 and second screw SW2 (i.e. first internal screw 611 and second internal screw 612), but is at a position apart from first virtual line V1. This serves to improve first screw SW1 and second screw SW2 in flexibility for arrangement, and improve first pipe L1 in efficiency for layout.

According to the present embodiment, first pipe L1 being the connection pipe has an L-shape bent at bent section 73 formed in a middle section of first pipe L1. From bent section 73, overhang 76 extends in the direction of the rotational axes of first screw SW1 and second screw SW2. When viewed in the direction of the rotational axes of first screw SW1 and second screw SW2, overhang 76 overlaps with first end opening 710 of first pipe L1. Overhang 76 has central axis X1 orthogonal to central axis X2 of second end opening 720 of first pipe L1.

Thus, according to the present embodiment, central axis X1 of overhang 76 overlaps with first end opening 710 of first pipe L1 when viewed in the direction of rotational axis Y1 of first screw SW1 and rotational axis Y2 of second screw SW2, while crossing central axis X2 of second end opening 720 of first pipe L1 at right angles. This facilitates efficient splitting of a mold upon molding of first pipe L1. This serves to eliminate excess material for first pipe L1, and reduce first pipe L1 in weight.

According to the present embodiment, first pipe L1 being the connection pipe includes an end directed oppositely to intake port E0 being the main communication port, in the direction of the rotational axis of valve element 3.

Thus, according to the present embodiment, pipe connection section 72 of first pipe L1 is directed to a side opposite to intake port E0 connected to the cylinder block not shown.

This serves to suppress the cylinder block from interfering with a connecting operation of pipe connection section 72 and the rubber pipe not shown, and thereby facilitates the connecting operation.

The control valve etc. according to the present invention is not limited to the above embodiment, but may be freely modified depending on specifications of an engine employed etc., provided that the effects of the present invention can be exerted.

Although the above embodiment shows an example in which the control valve (i.e. the flow rate control valve) is disposed in a circulation system of cooling water, the control valve can handle not only cooling water but also various kinds of fluid such as lubricating oil.

Although the above embodiment shows an example in which three openings of first discharge port E1, second discharge port E2, and third discharge port E3 in addition to intake port E0 are formed as communication ports according to the present invention, the number of discharge port(s) is not limited to three (i.e. first discharge port E1, second discharge port E2, and third discharge port E3), but may be at least one.

The configurations of communication port(s) according to the present invention is not limited to the above embodiment. For example, the communication ports may be composed of a combination of intake port E0 and other discharge ports (e.g. second discharge port E2 and third discharge port E3). In another manner, the communication port may be composed of a single discharge port. Thus, the communication port(s) according to the present invention may be freely configured depending on specifications of the control valve, e.g., merely intake port E0, merely the discharge ports E1 to E3, a combination of intake port E0 and the discharge ports E1 to E3, etc., provided that the communication port(s) serve(s) for introduction and/or discharge of cooling water.

First pipe L1 corresponding to the connection pipe (or a connection member) according to the present invention, and first screw SW1 and second screw SW2 corresponding to the fastening members (or screws) according to the present invention are not limited to the above embodiment. Specifically, first pipe L1, first screw SW1, and second screw SW2 may be made of not a metal, but any material less in linear expansion coefficient than housing 1 (in detail, first housing 11) corresponding to a housing (or a connection base) according to the present invention.

Regarding the two-member connecting structure according to the present invention, the above embodiment shows the flow rate control valve structured to control the flow rate of cooling water in the cooling circuit for the internal combustion engine of an automobile, as an example of a device used under an environment in which thermal expansion due to temperature variation occurs. However, the two-member connecting structure according to the present invention is not limited to that. Other than the flow rate control valve according to the above embodiment, the two-member connecting structure according to the present invention may be applied to any device used under an environment in which thermal expansion due to temperature variation occurs, such as a water pump.

The following describes exemplary aspects of a control valve according to the above embodiment.

According to one aspect, the control valve is for use in a heat exchange circuit of an engine of an automobile, and includes: a housing that is made of resin and includes a communication port structured for introduction or discharge of fluid; and a connection pipe that is made of metal and is fastened to the communication port with a fastening member made of metal.

According to a favorable aspect of the control valve, the fastening member is a self-tapping screw or a self-forming screw.

According to another favorable aspect of the control valve, in any one of the above aspects, the housing includes a projection in a vicinity of the communication port, and the connection pipe includes a depression structured to engage with the projection of the housing.

According to still another favorable aspect of the control valve, in any one of the above aspects, the connection pipe includes a bent section bent at a predetermined angle.

According to still another favorable aspect of the control valve, in any one of the above aspects, the predetermined angle is 90 degrees.

According to still another favorable aspect of the control valve, in any one of the above aspects, the connection pipe includes a pipe connection section that extends straight from the bent section and is structured to be connected to a rubber pipe.

According to still another favorable aspect of the control valve, in any one of the above aspects, the connection pipe is formed using a collapsible core.

According to still another favorable aspect of the control valve, in any one of the above aspects, the connection pipe includes an overhang projecting from the bent section, and the overhang includes an internal screw hole and an internal screw formed in the internal screw hole.

According to still another favorable aspect of the control valve, in any one of the above aspects, the connection pipe includes a pipe fixing portion structured to be in contact with the fastening member, and includes a rib extending from the pipe fixing portion to the overhang.

According to still another favorable aspect of the control valve, in any one of the above aspects, the bent section includes an arc-shaped inner periphery on which the fluid flows.

According to still another favorable aspect of the control valve, in any one of the above aspects, the connection pipe is made of aluminum.

The following describes exemplary aspects of a flow rate control valve according to the above embodiment.

According to one aspect, a flow rate control valve is for use in a cooling circuit of an engine of an automobile, the flow rate control valve includes: a housing including a valve container, a main communication port, a first communication port, a fixing base, and an internal screw part, wherein the valve container is formed inside the housing, the main communication port is structured for introduction of coolant into the valve container or for discharge of the coolant from the valve container, the first communication port is structured for discharge of the coolant from the valve container or for introduction of the coolant into the valve container, in cooperation with the main communication port, the fixing base is formed around the first communication port, and the internal screw part is formed in the fixing base; a valve element contained in the valve container of the housing and structured to be rotated and thereby control a flow rate of the coolant flowing between the main communication port and the first communication port of the housing; a screw part screwed in the internal screw part of the housing and made of material less in linear expansion coefficient than the housing; and a connection pipe that is connected to the first communication port of the housing, and includes a pipe fixing portion fixed to the fixing base of the housing with the screw part, and is made of material less in linear expansion coefficient than the housing.

According to a favorable aspect of the flow rate control valve, the internal screw part of the housing includes a first internal screw and a second internal screw, and the screw part includes a first screw screwed in the first internal screw and a second screw screwed in the second internal screw.

According to another favorable aspect of the flow rate control valve, in any one of the above aspects, the flow rate control valve further includes a projection formed in a vicinity of the first communication port of the housing. When viewed in a direction of a rotational axis of the first screw, the projection is disposed between a second virtual line and a third virtual line, where: the second virtual line crosses the rotational axis of the first screw, and is orthogonal to a first virtual line connecting the rotational axis of the first screw and a rotational axis of the second screw; and the third virtual line crosses the rotational axis of the second screw, and is orthogonal to the first virtual line.

According to still another favorable aspect of the flow rate control valve, in any one of the above aspects, the first communication port of the housing is apart from the first virtual line, and is disposed between the second virtual line and the third virtual line.

According to still another favorable aspect of the flow rate control valve, in any one of the above aspects, the connection pipe has an L-shape bent at a bent section formed in a middle section of the connection pipe, and the connection pipe includes an overhang extending from the bent section in a direction of a rotational axis of the screw part, and overlapping with a first end opening of the connection pipe when viewed in the direction of the rotational axis of the screw part, and the overhang of the connection pipe has a central axis orthogonal to a central axis of a second end opening of the connection pipe.

According to still another favorable aspect of the flow rate control valve, in any one of the above aspects, the connection pipe includes an end directed to a side opposite to the main communication port of the housing in a direction of a rotational axis of the valve element.

The following describes an exemplary aspect of a two-member connecting structure according to the above embodiment.

According to one aspect, a two-member connecting structure is for use under an environment in which thermal expansion due to temperature variation occurs, and includes: a connection base made of resin; a fastening member made of metal and screwed in the connection base; and a connection member made of metal and fastened and thereby connected to the connection base with the fastening member.

The invention claimed is:

1. A control valve for use in a heat exchange circuit of an engine of an automobile, the control valve comprising:
   a housing that is made of resin and includes a communication port structured for introduction or discharge of fluid; and
   a connection pipe that is made of metal and is fastened to the communication port with a fastening member made of metal.

2. The control valve as claimed in claim 1, wherein the fastening member is a self-tapping screw or a self-forming screw.

3. The control valve as claimed in claim 2, wherein:
   the housing includes a projection in a vicinity of the communication port; and the connection pipe includes a depression structured to engage with the projection of the housing.

4. The control valve as claimed in claim 1, wherein the connection pipe includes a bent section bent at a predetermined angle.

5. The control valve as claimed in claim 4, wherein the predetermined angle is 90 degrees.

6. The control valve as claimed in claim 5, wherein the connection pipe includes a pipe connection section that extends straight from the bent section and is structured to be connected to a rubber pipe.

7. The control valve as claimed in claim 5, wherein the connection pipe is formed using a collapsible core.

8. The control valve as claimed in claim 4, wherein:
the connection pipe includes an overhang projecting from the bent section; and
the overhang includes an internal screw hole and an internal screw formed in the internal screw hole.

9. The control valve as claimed in claim 8, wherein the connection pipe includes a pipe fixing portion structured to be in contact with the fastening member, and includes a rib extending from the pipe fixing portion to the overhang.

10. The control valve as claimed in claim 4, wherein the bent section includes an arc-shaped inner periphery on which the fluid flows.

11. The control valve as claimed in claim 1, wherein the connection pipe is made of aluminum.

12. A flow rate control valve for use in a cooling circuit of an engine of an automobile, the flow rate control valve comprising:
a housing including a valve container, a main communication port, a first communication port, a fixing base, and an internal screw part, wherein:
the valve container is formed inside the housing;
the main communication port is structured for introduction of coolant into the valve container or for discharge of the coolant from the valve container;
the first communication port is structured for discharge of the coolant from the valve container or for introduction of the coolant into the valve container, in cooperation with the main communication port;
the fixing base is formed around the first communication port; and
the internal screw part is formed in the fixing base;
a valve element contained in the valve container of the housing and structured to be rotated and thereby control a flow rate of the coolant flowing between the main communication port and the first communication port of the housing;
a screw part screwed in the internal screw part of the housing and made of material less in linear expansion coefficient than the housing; and
a connection pipe that is connected to the first communication port of the housing, and includes a pipe fixing portion fixed to the fixing base of the housing with the screw part, and is made of material less in linear expansion coefficient than the housing.

13. The flow rate control valve as claimed in claim 12, wherein:
the internal screw part of the housing includes a first internal screw and a second internal screw; and
the screw part includes a first screw screwed in the first internal screw and a second screw screwed in the second internal screw.

14. The flow rate control valve as claimed in claim 13, the flow rate control valve further comprising:
a projection formed in a vicinity of the first communication port of the housing,
wherein when viewed in a direction of a rotational axis of the first screw, the projection is disposed between a second virtual line and a third virtual line, where:
the second virtual line crosses the rotational axis of the first screw, and is orthogonal to a first virtual line connecting the rotational axis of the first screw and a rotational axis of the second screw; and
the third virtual line crosses the rotational axis of the second screw, and is orthogonal to the first virtual line.

15. The flow rate control valve as claimed in claim 14, wherein the first communication port of the housing is apart from the first virtual line, and is disposed between the second virtual line and the third virtual line.

16. The flow rate control valve as claimed in claim 12, wherein:
the connection pipe has an L-shape bent at a bent section formed in a middle section of the connection pipe;
the connection pipe includes an overhang extending from the bent section in a direction of a rotational axis of the screw part, and overlapping with a first end opening of the connection pipe when viewed in the direction of the rotational axis of the screw part; and
the overhang of the connection pipe has a central axis orthogonal to a central axis of a second end opening of the connection pipe.

17. The flow rate control valve as claimed in claim 16, wherein the connection pipe includes an end directed to a side opposite to the main communication port of the housing in a direction of a rotational axis of the valve element.

18. A two-member connecting structure for use under an environment in which thermal expansion due to temperature variation occurs, the two-member connecting structure comprising:
a connection base made of resin;
a fastening member made of metal and screwed in the connection base; and
a connection member made of metal and fastened and thereby connected to the connection base with the fastening member.

* * * * *